United States Patent Office 3,267,127
Patented August 16, 1966

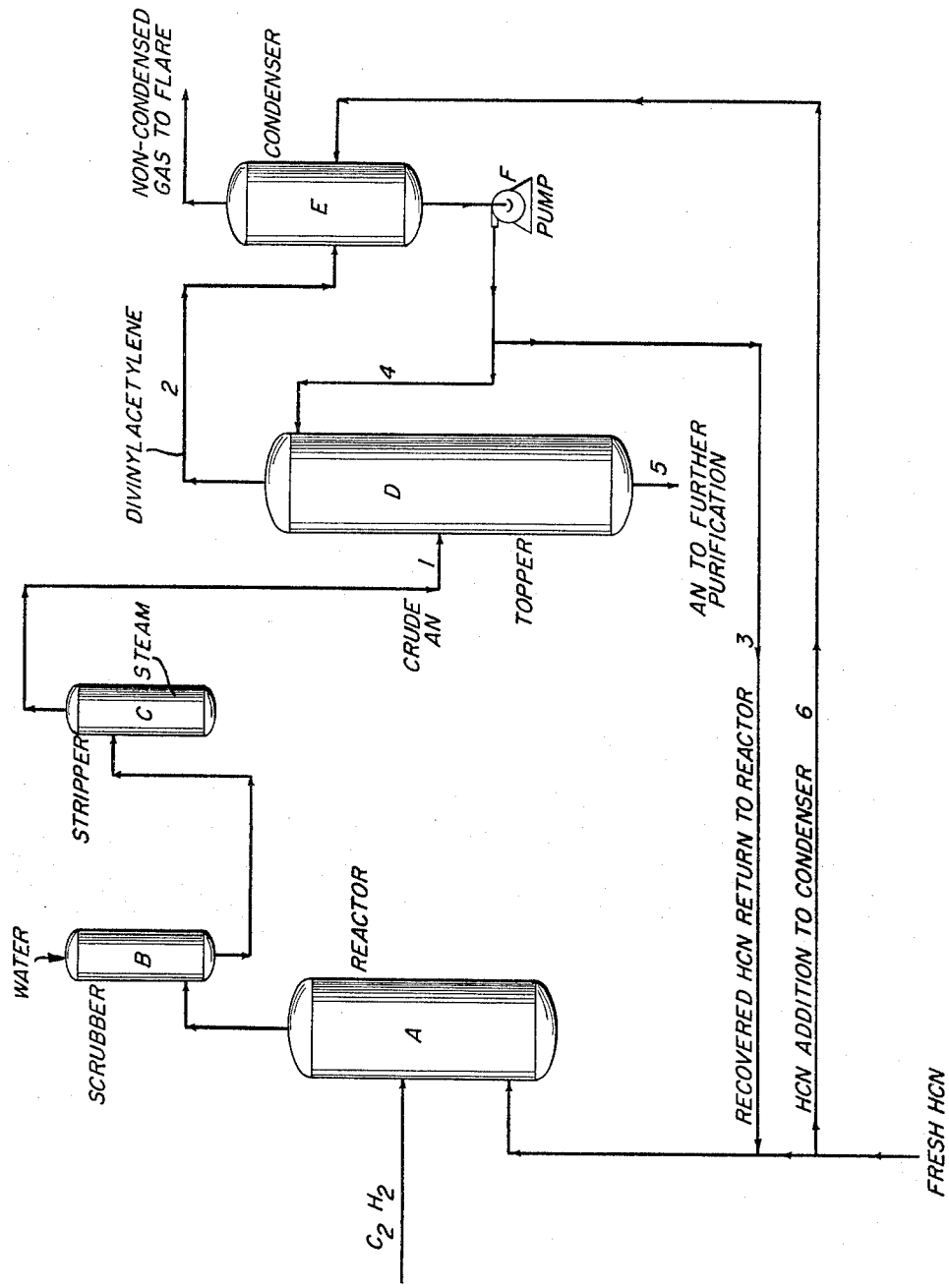

3,267,127
PROCESS FOR SEPARATION OF
ACRYLONITRILE
Andrew Malcolm Patterson, Jr., and Herbert Palfrey Pursell, Jr., Metairie, La., assignors to American Cyanamid Company, Stamford, Conn., a corporation of Maine
Filed July 11, 1963, Ser. No. 294,388
5 Claims. (Cl. 260—465.3)

This invention relates to the preparation of acrylonitrile. More particularly, it relates to the refining of crude acrylonitrile prepared by the catalytic reaction of acetylene and hydrocyanic acid. Even more particularly, it relates to the separation of acrylonitrile from divinylacetylene and low boiling impurities.

During the production of acrylonitrile from the reaction of acetylene with hydrocyanic acid in the liquid phase employing a cuprous salt catalyst, a number of acetylene derivatives such as monovinylacetylene, divinylacetylene, its homolog, ethynylbutadiene, vinyl chloride, chloroprene, acetaldehyde, cyanobutadiene, methylvinylketone and lactonitrile are obtained. These impurities with boiling points which range above and below the boiling point of acrylonitrile are usually removed by numerous distillations and fractionations. However, even when these multi-step refining procedures are carried out on a crude acrylonitrile containing such impurities, not infrequently, the acrylonitrile product is contaminated by trace amounts (measured as parts per million) of acetaldehyde, methylvinylketone, cyanobutadiene, lactonitrile and divinylacetylene. For many applications, the presence of even such trace amounts is detrimental. For example, when acrylonitrile is to be employed for the production of acrylic fibers, the level of methylvinylketone, cyanobutadiene and divinylacetylene must be kept below extremely low limits in order that the resultant fibers be of high quality.

There have been numerous attempts made to remove such impurities, particularly the divinylacetylene impurity, in order to obtain a high quality acrylonitrile product. A rather extensive survey of the numerous methods and procedures which have been proposed for the removal of divinylacetylene from acrylonitrile appears in United States Patent No. 2,878,166 to J. T. Dunn, patented March 17, 1959. From the number of methods and procedures suggested for eliminating divinylacetylene from acrylonitrile described in that patent, it is to be seen that this contaminant has been a particularly vexing problem to acrylonitrile procedures for many years.

Apart from the numerous proposals heretofore suggested and adopted for the removal of divinylacetylene from acrylonitrile, no one of which is entirely adequate for the complete elimination of this impurity, consideration has also been given by those skilled in the art to an alternative method of reducing or eliminating the divinylacetylene content of acrylonitrile. It will be noted that the many procedures suggested in the Dunn patent for eliminating divinylacetylene from crude acrylonitrile product proceed on the basis that divinylacetylene is already a contaminant. Numerous workers have known that if the vapor pressure of hydrogen cyanide above the catalyst in the reactor is maintained at a high level, the amount of divinylacetylene which is produced is thereby correspondingly decreased. Such a method of reducing or eliminating the divinylacetylene content of crude acrylonitrile would seem to be the most direct and most straightforward procedure were it not for several disadvantages to such a technique. Thus, it has been noted that a high partial pressure of hydrogen cyanide in the reactor causes a decrease in the activity of the cuprous salt catalyst. Consequently, the overall production rate of acrylonitrile from a given reactor unit is then decreased. In addition, utilizing a higher partial pressure of HCN above the catalyst increases the cost of the catalyst since, because of its reduced activity, more catalyst must be purged from the reactor with a corresponding loss in copper values. Moreover, a higher partial pressure of hydrogen cyanide within the reactor increases the demand for hydrochloric acid which is used to maintain a proper solubilizer ratio in the reactor thereby causing the production of additional quantities of vinyl chloride since the increased amount of hydrogen chloride being admitted to the reactor is also available to react with acetylene. Consequently, it is seen that neither reducing or eliminating the formation of divinylacetylene nor eliminating or reducing it after it is formed is entirely satisfactory.

It is an object of this invention to remove trace impurities from acrylonitrile while avoiding the disadvantages of the numerous prior art methods.

It is a further object of this invention to reduce the amount of divinylacetylene and low boiling impurities in product acrylonitrile.

It is a still further object of this invention to improve the quality of acrylonitrile by reducing the divinylacetylene concentration thereof.

Still further, it is an object of this invention to improve the efficiency of separation of divinylacetylene from acrylonitrile with essentially no increase in operating costs or reduction in equipment capacity.

In accordance with the present invention, it has been discovered that a crude wet acrylonitrile solution containing divinylacetylene and low boiling impurities may be readily freed from such contaminants by distilling said crude wet acrylonitrile solution, withdrawing divinylacetylene and low boiling impurities from the distillation column and passing the same to a condenser, adding substantially divinylacetylene-free hydrogen cyanide to the condenser and returning a first portion of the so-condensed impurities to the column and recovering a substantially divinylacetylene-free and low boiling impurities-free acrylonitrile from the bottom of the column. A feature of the present invention is that a second portion of the so-condensed impurities may be recycled to the reactor. Thus, hydrogen cyanide, which is contained within such portion as well as that which is added, may be used for the production of additional acrylonitrile.

A consideration of several conventional methods of separation of a light or pseudo-light material from a heavier material is believed to be proper for a better understanding of the present invention. Thus, in the distillation of crude wet acrylonitrile solution, in order to remove low boiling impurities (i.e., light materials) therefrom, it is known that the distillation column might be operated with a higher ratio of reflux to overheads product. This has the disadvantage that operating costs are increased and equipment capacity is reduced. It is also known that a purge stream might be withdrawn from the column at a point of maximum concentration of the contaminant within the column. However, this method requires additional processing equipment. The present invention differs from the two methods in that there is added to the condenser to which the low boiling impurities are admitted a pure stream of one of the light materials (hydrogen cyanide) being separated in the distillation column so as to reduce the concentration in the reflux of another material (divinylacetylene), which surprisingly behaves as a light material, being separated. This in turn reduces the concentration of the undesirable component (divinylacetylene) in the bottom of the distillation column.

The process of the present invention is further described with reference to the accompanying drawing, a flow sheet illustrating a preferred embodiment.

In the preparation of acrylonitrile by reacting hydrogen cyanide and acetylene in a reactor A, it is customary to scrub the reactor gases with water in a scrubber B. In this manner, a dilute aqueous acrylonitrile solution is obtained containing various impurities such as hydrogen cyanide, acetylene, acetaldehyde, methylvinylketone, cyanobutadiene, lactonitrile, vinyl chloride, chloroprene, monovinylacetylene, divinylacetylene and ethylvinylbutadiene. The dilute aqueous acrylonitrile solution is then usually subjected to steam stripping in a stripper C to recover the acrylonitrile in a more concentrated form. The resultant concentrate 1 containing hydrogen cyanide, divinylacetylene and other contaminants is then fed into a topper or light ends removal column D where low boiling materials (that is, those having a boiling point below about 70° C.) are separated from acrylonitrile. The overheads from the column pass via line 2 to a condenser E where the overheads are condensed. Part of the condensed overheads is returned via pump F to the acrylonitrile reactor via line 3 for hydrogen cyanide recovery, the remainder being refluxed via line 4 to the topper or light ends removal column. Normally, the ratio of flow of line 4 to line 3 is between 7/1 to 10/1 for complete separation of hydrogen cyanide from acrylonitrile. While divinylacetylene, a higher boiling material than hydrogen cyanide or acrylonitrile, would usually be expected to leave the bottom of the light ends removal column with acrylonitrile in stream 5 and eventually become a product contaminant, it has been observed that in this column divinylacetylene is concentrated in the top and in the condenser along with the low boiling materials. Because of this behavior of divinylacetylene in this system, some separation of divinylacetylene from acrylonitrile is accomplished by operation of the topper or light ends removal column while maintaining the ratio of flow of line 4 to line 3 in the manner described. The degree of separation of divinylacetylene from acrylonitrile in this column thus determines the divinylacetylene content of product acrylonitrile for given production rates of divinylacetylene and acrylonitrile.

It has been discovered that by continuously adding a stream of fresh hydrogen cyanide (free of divinylacetylene) (line 6) into the condenser, more complete separation of divinylacetylene from acrylonitrile is accomplished in the topper or light ends removal column. The fresh hydrogen cyanide is returned to the reactor with the recovered hydrogen cyanide via line 3 and the flow in line 3 is increased by the amount of fresh hydrogen cyanide added. The ratio of $$\frac{\text{line 4}}{\text{line 3-line 6}}$$

is preferably maintained at 7/1 to 10/1 although the use of higher or of lower ratios is not precluded. Since divinylacetylene tends to concentrate in the condenser and in this recovered hydrogen cyanide stream, the addition of fresh hydrogen cyanide causes a reduction in the divinylacetylene concentration in the condenser and results in a lower concentration of divinylacetylene in the reflux to the light ends removal column and in the acrylonitrile leaving the bottom of the light ends removal column. This then results in a lower divinylacetylene concentration in product acrylonitrile. The non-condensed impurities such as vinyl chloride, acetylene, monovinylacetylene and some divinylacetylene are removed from the condenser, vented and burned.

After recovery of product acrylonitrile from the bottom of the light ends removal column, the acrylonitrile so obtained is then subjected to additional conventional purification steps such as, for example, distilling, stripping, etc.

The addition of hydrogen cyanide to the reactor in excess of the amount stoichiometrically required is, of course, known as has been pointed out hereinabove. Moreover, providing a free hydrogen cyanide content in a crude acrylonitrile solution in excess of the equivalent acetaldehyde content prior to distillation or azeotropic distillation is also known. Cf., United States Patent Nos. 2,798,035 and 3,080,301. However, the process of the present invention in which additional hydrogen cyanide is added to a condenser wherein low boilers and divinylacetylene are condensed after having been withdrawn as overhead from a topper or light ends removal column is readily distinguished from the process described in either of the aforementioned patents. Thus, the addition of hydrogen cyanide to crude acrylonitrile prior to distillation requires additional equipment and processing steps for the subsequent removal of hydrogen cyanide so added. In the process of the present invention, by contrast, the discovery is predicated on the principle that, since divinylacetylene is unexpectedly concentrated in the overheads of the light ends removal column, the addition of divinylacetylene-free hydrogen cyanide to the condenser reduces the total amount of divinylacetylene being returned as reflux and hence affords ready separation of divinylacetylene and low boiling materials. Adding hydrogen cyanide directly to the condenser wherein such low boiling materials and divinylacetylene are condensed does not necessitate additional equipment or further refining steps. Such steps are eliminated since the non-condensed low boiling materials and some divinylacetylene are usually burned as waste while the condensed gases, that is, hydrogen cyanide containing some divinylacetylene are returned to the reactor. Thus, not only hydrogen, cyanide, which is condensed, but also that which is added, may be utilized for the production of additional acrylonitrile.

The amount of pure, i.e., substantially divinylacetylene-free, hydrogen cyanide to be added to the condenser wherein the overheads from the topper or light ends removal column are condensed is not especially critical. It is generally advantageous, however, that amount added is such so as to reduce the concentration of the undesirable divinylacetylene component in the reflux to the topper or light ends removal column but it is not such a quantity as would be detrimental to the purpose and operation of the column. Preferably, a stream of purse, i.e., substantially divinylacetylene-free, hydrogen cyanide of approximately 20 parts to 50 parts based on 100 parts of overhead being removed from the topper or light ends removal column (on a volume/volume basis) is added to the condenser. The divinylacetylene concentration in the reflux is thereby reduced to a tolerable level. This consequently lowers the concentration of the undesirable components, especially divinylacetylene, in the acrylonitrile removed as column bottoms.

The condenser may be any one of those conventionally employed. The present invention is thus not to be restricted to any particular type.

In order to better illustrate the present invention, the following examples are given in which the effect of adding pure (i.e., substantially divinylacetylene-free) hydrogen cyanide to the condenser is compared with that observed when the same is not added. These examples are by way of illustration and not by way of limitation.

*Example 1*

Hydrogen cyanide is reacted with acetylene in the presence of aqueous cuprous salt catalyst in a conventional manner. The reactor gases are then introduced to a scrubber or water absorber and the scrubber or absorber bottoms are subsequently admitted to a stripper. From the stripper the crude acrylonitrile is then introduced to a topper or light ends removal column. The crude acrylonitrile solution fed to the column has the following composition:

| | | |
|---|---|---|
| Acrylonitrile | percent | 75.0 |
| Water | do | 7.5 |
| Methylvinylketone | p.p.m. | <300 |
| Lactonitrile | percent | 9.6 |
| Hydrogen cyanide | do | 7.5 |
| Acetaldehyde | p.p.m. | <100 |
| Cyanobutadiene | percent | 0.2 |
| Divinylacetylene | p.p.m. | 57 |
| Monovinylacetylene | p.p.m. | <100 |
| Chloroprene | p.p.m. | <100 |
| Vinyl chloride | percent | 0.2 |

The column is operated at an overhead temperature of 38° C. and the overhead vapors are drawn off and admitted to a condenser.

The vent gases from the condenser are at a temperature of 28° C.

The condensed gases have the following composition:

| | | |
|---|---|---|
| Acrylonitrile | percent | 1.9 |
| Water | do | 0.1 |
| Methylvinylketone | p.p.m. | <100 |
| Lactonitrile | p.p.m. | <100 |
| Hydrogen cyanide | percent | 98.0 |
| Acetaldehyde | p.p.m. | <100 |
| Cyanobutadiene | p.p.m. | <100 |
| Divinylacetylene | p.p.m. | 502 |
| Monovinylacetylene | p.p.m. | <100 |
| Chloroprene | p.p.m. | <100 |
| Vinyl chloride | p.p.m. | <100 |

One portion of the condensed gases is refluxed to the topper or light ends removal column while another portion is recycled to the reactor. The ratio of the portion returned to the topper or light ends removal column to that returned to the reactor is maintained at 5/1.

The composition of the topper or light ends removal column bottoms is as follows:

| | | |
|---|---|---|
| Acrylonitrile | percent | 81.0 |
| Water | do | 8.1 |
| Methylvinylketone | p.p.m. | <300 |
| Lactonitrile | percent | 10.7 |
| Hydrogen cyanide | p.p.m. | 200 |
| Acetaldehyde | p.p.m. | <100 |
| Cyanobutadiene | percent | 0.2 |
| Divinylacetylene | p.p.m. | 10 |

The bottoms from the topper or light ends removal column are withdrawn and subsequently fed to other columns for drying, finishing and stripping.

*Example 2*

The procedure of Example 1 is repeated in all essential respects except that the ratio of the portion of the condensed gases returned to the topper or light ends removal column to that returned to the reactor is maintained at about 8/1.

The crude acrylonitrile solution fed to the column has the following composition:

| | | |
|---|---|---|
| Acrylonitrile | percent | 75.0 |
| Water | do | 7.5 |
| Methylvinylketone | p.p.m. | <300 |
| Lactonitrile | percent | 9.6 |
| Hydrogen cyanide | do | 7.5 |
| Acetaldehyde | p.p.m. | <100 |
| Cyanobutadiene | percent | 0.2 |
| Divinylacetylene | p.p.m. | 57 |
| Monovinylacetylene | p.p.m. | <100 |
| Chloroprene | p.p.m. | <100 |
| Vinyl chloride | percent | 0.2 |

The column is operated at an overhead temperature of 38° C. and the overhead vapors are drawn off and admitted to a condenser.

The vent gases from the condenser are at a temperature of 28° C.

The condensed gases have the following composition:

| | | |
|---|---|---|
| Acrylonitrile | percent | 1.4 |
| Water | do | 0.1 |
| Methylvinylketone | p.p.m. | <100 |
| Lactonitrile | p.p.m. | <100 |
| Hydrogen cyanide | percent | 98.5 |
| Acetaldehyde | p.p.m. | <100 |
| Cyanobutadiene | p.p.m. | <100 |
| Divinylacetylene | p.p.m. | 560 |
| Monovinylacetylene | p.p.m. | <100 |
| Chloroprene | p.p.m. | <100 |
| Vinyl chloride | p.p.m. | <100 |

One portion of the condensed gases is refluxed to the topper or light ends removal column while another portion is recycled to the reactor. The ratio of the portion returned to the topper or light ends removal column to that recycled is maintained at about 8/1.

The composition of the topper or light ends removal column bottoms is as follows:

| | | |
|---|---|---|
| Acrylonitrile | percent | 81.0 |
| Water | do | 8.1 |
| Methylvinylketone | p.p.m. | <300 |
| Lactonitrile | percent | 10.7 |
| Hydrogen cyanide | p.p.m. | 75 |
| Acetaldehyde | p.p.m. | <100 |
| Cyanobutadiene | percent | 0.2 |
| Divinylacetylene | p.p.m. | 5 |

The bottoms from the topper or light ends removal column are withdrawn and subsequently fed to other columns for drying, finishing and stripping.

*Example 3*

The procedure of Example 2 is repeated in all essential respects with a crude acrylonitrile solution having the same composition being admitted to the topper or light ends removal column. Pure, i.e., substantially divinylacetylene-free, hydrogen cyanide is admitted to the condenser together with the overhead gases in the ratio of 25 parts of divinylacetylene-free hydrogen cyanide to 100 parts of overhead gases.

The vent gases from the condenser are at a temperature of 28° C.

A portion of the now mixed liquid stream leaving the condenser having the following composition

| | | |
|---|---|---|
| Acryonitrile | percent | 1.0 |
| Water | do | 0.1 |
| Methylvinylketone | p.p.m. | <100 |
| Lactonitrile | p.p.m. | <100 |
| Hydrogen cyanide | percent | 98.9 |
| Acetaldehyde | p.p.m. | <100 |
| Cyanobutadiene | p.p.m. | <100 |
| Divinylacetylene | p.p.m. | 216 |
| Monovinylacetylene | p.p.m. | <100 |
| Chloroprene | p.p.m. | <100 |
| Vinyl chloride | p.p.m. | <100 | is recycled to the reactor while another portion of this stream is refluxed to the topper or light ends removal column. The ratio of the portion returned to the topper or light ends removal column to that recycled to the reactor has decreased to 2.5/1. Taking into account that in Examples 1 and 2, line 6 was zero and the ratio of line 4 to line 3 was 5/1 and 8/1, respectively, the ratio of line 4 to line 3 minus line 6 in this example is still maintained at about 8/1. There has been no other change in the operating conditions of the topper or light ends removal column.

The composition of the light ends removal column bottoms is as follows:

| | | |
|---|---|---|
| Acrylonitrile | percent | 81.0 |
| Water | do | 8.1 |
| Methylvinylketone | p.p.m | <300 |
| Lactonitrile | percent | 10.7 |
| Acetaldehyde | p.p.m | <100 |
| Cyanobutadiene | percent | 0.2 |
| Divinylacetylene | p.p.m | 1 |

The bottoms from the light ends removal column are withdrawn and subsequently fed to another columns for drying, finishing and stripping.

While varying the ratio of return to topper or light ends removal column to recycle to the reactor accomplishes a significant decrease in the amount of divinylacetylene in the topper or light ends removal column buttons, it is apparent that by operating according to the process of the present invention the amount of divinylacetylene is reduced from 5 p.p.m. (the concentration in the bottoms in Example 2) to 1 p.p.m. (the concentration in the bottoms in Example 3), a reduction of 80%. Since divinylacetylene has been effectively eliminated in the topper or light ends removal column, the subsequent refining steps are now more easily accomplished.

While the foregoing invention has been described in conjunction with various preferred embodiments, it is to be understood that the invention is not to be limited thereto but is to be construed broadly and it is to be limited only by the appended claims.

We claim:

1. A process for the separation of acrylonitrile from divinylacetylene and low boiling impurities which comprises passing a crude acrylonitrile solution containing said divinylacetylene and said impurities to a column to distill the same, withdrawing said divinylacetylene and said impurities from the top of said column, passing the same to a condenser, adding substantially divinylacetylene-free hydrogen cyanide to said condenser, returning a first portion of the so-condensed impurities to the column, and recovering a substantially divinylacetylene-free and low boiling impurities-free acrylonitrile from the bottom of said column.

2. A process as in claim 1 wherein the crude acrylonitrile solution is obtained by reacting acetylene and hydrogen cyanide in a reactor and in which a second portion of the so-condensed impurities is recycled to said reactor.

3. A process as in claim 2 in which non-condensed impurities are withdrawn from said condenser.

4. A process for the separation of acrylonitrile from divinylacetylene and low boiling impurities which comprises passing a crude acrylonitrile solution containing said divinylacetylene and said impurities to a column to distill the same, withdrawing said divinylacetylene and said impurities from the top of said column, passing the same to a condenser, adding substantially divinylacetylene-free hydrogen cyanide to said condenser, returning a first portion of the so-condensed impurities to the column, and recovering a substantially divinylacetylene-free and low boiling impurities-free acrylonitrile from the bottom of said column, wherein the crude acrylonitril solution is obtained by reacting acetylene and hydrogen cyanide in a reactor and a second portion of the so-condensed impurities is recycled to said reactor, and in which the ratio of the amount of the so-condensed impurities returned to said column with respect to the difference between the amount of the so-condensed impurities recycled to said reactor and the amount of hydrogen cyanide added to said condenser is maintained at about 7/1 to about 10/1.

5. A process as in claim 4 in which the volum/volume ratio of substantially divinylacetylene-free hydrogen cyanide passed to the condenser to divinylacetylene and low boiling impurities passed to the condenser is maintained at between about 1 to 5 to about 1 to 2.

References Cited by the Examiner

UNITED STATES PATENTS

| | | | |
|---|---|---|---|
| 2,672,435 | 3/1954 | Shoptaw | 202—40 |
| 2,798,035 | 7/1957 | Derbenwick et al. | |
| 2,878,166 | 3/1959 | Dunn | 260—465.3 |
| 3,007,853 | 11/1961 | Patron et al. | 202—57 |
| 3,053,881 | 9/1962 | Kremer et al. | 260—465.3 |
| 3,080,301 | 3/1963 | Fontana et al. | 260—465.3 |

NORMAN YUDKOFF, *Primary Examiner.*

F. E. DRUMMOND, *Assistant Examiner.*